April 26, 1949.
T. M. THOMAS
2,468,278
DISK GANG ASSEMBLY
Filed July 6, 1944
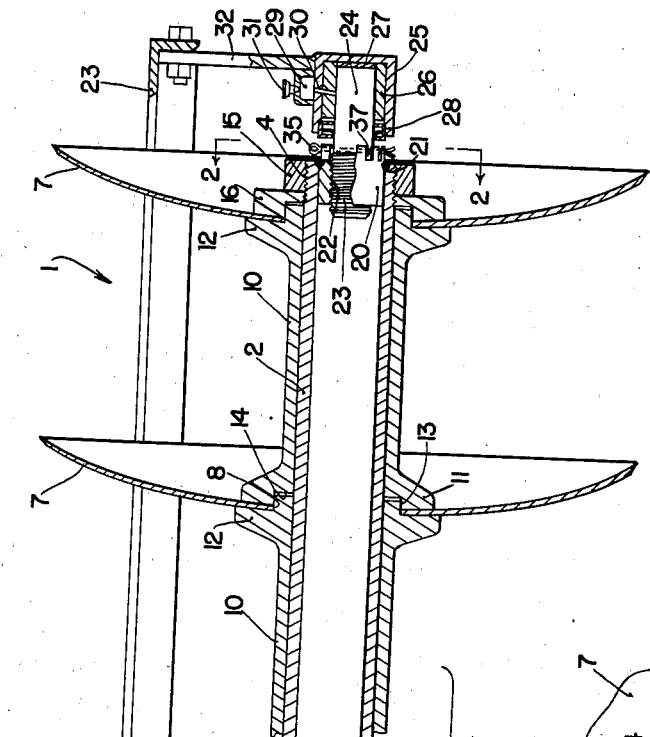
FIG. 1
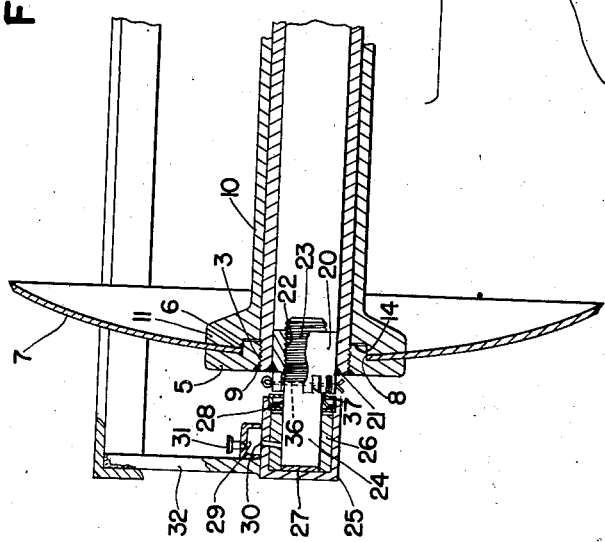
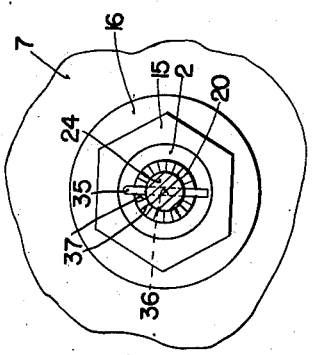
FIG. 2
INVENTOR.
THOMAS M. THOMAS
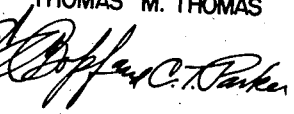
ATTORNEYS
WITNESS

Patented Apr. 26, 1949

2,468,278

UNITED STATES PATENT OFFICE 2,468,278

DISK GANG ASSEMBLY

Thomas M. Thomas, Huntington Park, Calif., assignor to John Deere Killerfer Company, a corporation of California Application July 6, 1944, Serial No. 543,638

3 Claims. (Cl. 308—19)

The present invention relates to disk gang assemblies for ground working tools such as disk harrows, etc., and has for its principal object the provision of a novel and improved disk gang which is simpler and less expensive to manufacture than those heretofore known to those skilled in the art but which is strong and durable in operation. In U. S. Patent No. 2,272,100, granted February 3, 1942 to Wadelton, Sjogren and myself, we disclose a disk gang construction employing a fixed or "dead" axle on which the disk supporting tubular shaft is journaled. Although this type of construction has many advantages, an object of the present invention is to reduce the cost of manufacture by eliminating the long axle member.

Patent No. 2,256,220, granted to Sjogren September 16, 1941, shows a disk gang construction employing a "live" or rotating axle, but the long axle is a necessary part of this structure and furthermore, this construction does not provide the flexibility of longitudinal adjustment that is found in Patent No. 2,272,100, for adjusting for wear in the thrust bearings and to compensate for expansion and contraction of the gang. Therefore, a more specific object of the present invention has to do with a disk gang construction in which the gang bolt is eliminated and which provides for ample and simple longitudinal adjustment to compensate for expansion and contraction of the gang and for wear in the thrust bearings.

In the accomplishment of these objects, the gang bolt or axle is replaced by a pair of stub shafts or axles adjustable axially relative to the disk supporting tube by threading them into the ends thereof, respectively. The ends of the stub shafts are carried in combined radial and thrust bearings which are cup-shaped and are sealed around the shaft opening to exclude dust and to retain lubricant therein.

These and other objects and advantages of my invention will be apparent to those skilled in the art after a consideration of the drawings appended hereto, in which Figure 1 is a longitudinal sectional view taken through a disk gang along the axis of rotation.

Figure 2 is a section taken along a line 2—2 in Figure 1.

Referring to the drawings, the disk gang is indicated generally by reference numeral 1, and comprises a main supporting tube 2, both ends of which are externally threaded at 3, 4. An end bracket 5 is mounted on the threaded end 3 and comprises a hub portion 6 of square cross section adapted to receive a concavo-convex ground working disk 7 having a central square opening 8 adapted to receive the hub portion 6. The convex side of the disk 7 bears against the body of the bracket 5, the latter being preferably welded permanently to the tube 2 as indicated at 9. Other disks 7 are mounted on the tube 2 and are maintained in spaced relation by spacing spools 10 having flanges 11 at one end adapted to bear against the concave sides of the adjacent disks and other flanges 12 at the other end adapted to bear against the convex sides of the adjacent disks. Each flange 12 is provided with a square hub 13 which fits into a corresponding socket 14 in the adjoining spool. A securing nut 15 engages the threaded end 4 of the tube 2 and bears against a washer 16 which, in turn, engages the concave side of the disk at that end of the gang. Thus, by tightening the nut 15, the entire assembly of disks 7 and spools 10 is clamped tightly against the end bracket 5 and secured against rotation relative to the tube 2.

Each end of the tube 2 is provided with a collar 20, which fits within the end of the tube and is fixed thereto, as by welding, as indicaed at 21. Each collar 20 is internally threaded at 22, to receive the threaded end 23 of a stub axle or shaft 24, which is disposed coaxially of the tube 2 and projects therebeyond. Each stub shaft 24 is received within a cup-shaped bearing housing 25 and is journaled in a suitable bearing sleeve 26 mounted therein. The outer end of each shaft 24 cooperates with a thrust bearing plate 27 in the closed end of the housing 25. The open end of each housing 25 is provided with an annular sealing device 28 of any suitable conventional type, which fits tightly into the housing and embraces the shaft 24 to exclude dirt and dust from the housing and to retain lubricant therein. Each housing is provided with a lubricant chamber 29 connected by a passage 30 with the bearing and has a lubricant supply fitting 31 attached thereto.

Each housing 25 is fixed to the lower end of a bracket 32 which is fixed to and depends from a structural frame 33.

Each of the stub shafts 24 is adjustable axially of the tube 2 by turning it in its threaded collar 20 to adjust the end play of the disk assembly between the two thrust bearings 27. The shafts 24 are fixed to the collars 20 in adjusted position by means of an associated cotter pin 35, which is inserted through an aperture 36 in the shaft 24 and lies in any of a plurality of open notches 37 in the outer edge of the collar 20, outside the tube 2, thereby preventing relative rotation between the shafts 24 and tube 2 during operation.

It is believed that the above described disk gang assembly has advantages of simplicity and accessibility over those known to the art, with effective but simple adjustment of end play. Obviously, it is not necessary to dismantle any part of the disk clamping structure to obtain access to the bearings for maintenance purposes.

I claim:

1. In a disk gang construction, the combination of a frame, a disk supporting tube, a stub shaft, means for fixedly securing said shaft in one end of said tube comprising an internally threaded collar mounted rigidly in the end of said tube, said stub shaft being threaded to cooperate therewith for adjusting said shaft axially of said tube and having a radial hole therein, a pin adapted to be inserted into said hole and to project outwardly thereof, said collar being provided with notches in its outer edge to receive said pin to lock said stub shaft in axially adjusted position, and a cup shaped combined radial and thrust bearing fixed to said frame with the open end thereof positioned to receive said stub shaft.

2. In a disk gang construction, the combination of a frame, a disk supporting tube, a pair of stub shafts, means for fixedly securing said shafts in opposite ends of said tube, respectively, comprising an internally threaded collar mounted rigidly in each end of said tube, said stub shafts being threaded to cooperate therewith for adjusting said shafts axially of said tube, and each shaft having a radial aperture therethrough, a pin adapted to be inserted into each aperture and to project outwardly thereof, said collar being provided with notches in its outer edge to receive said pin to lock said stub shafts in axially adjusted position, and a pair of bearings fixed to said frame for rotatably supporting said stub shafts.

3. In a disk gang construction, the combination of a disk supporting tube, a stub shaft, means for fixedly securing said shaft in one end of said tube, comprising an internally threaded collar mounted rigidly in the end of said tube, said stub shaft being threaded to cooperate therewith for adjusting said shaft axially of said tube and having a radial aperture therein, and a pin adapted to be inserted into said aperture and to project outwardly thereof, said collar being provided with notches in its outer edge to receive said pin to lock said stub shaft in axially adjusted position.

THOMAS M. THOMAS.

REFERENCES CITED

The following references are of record in the file of this patent:

UNITED STATES PATENTS

| Number | Name | Date |
|---|---|---|
| Re. 21,145 | Goble | July 11, 1939 |
| 119,504 | Brooks | Oct. 3, 1871 |
| 296,554 | Godfrey | Apr. 8, 1884 |
| 527,708 | McCorkindale | Oct. 16, 1894 |
| 804,030 | Ostrander | Nov. 7, 1905 |
| 2,135,192 | Mitchell et al. | Nov. 1, 1938 |
| 2,248,069 | Domries | July 8, 1941 |
| 2,331,738 | Seaholm | Oct. 12, 1943 |

Certificate of Correction

Patent No. 2,468,278. April 26, 1949.

THOMAS M. THOMAS

It is hereby certified that the name of the assignee in the above numbered patent was erroneously described and specified as "John Deere Killerfer Company" whereas said name should have been described and specified as *John Deere Killefer Company*, as shown by the record of assignments in this Office; and that the said Letters Patent should be read with this correction therein that the same may conform to the record of the case in the Patent Office.

Signed and sealed this 4th day of October, A. D. 1949.

[SEAL]

THOMAS F. MURPHY,
*Assistant Commissioner of Patents.*